Sept. 5, 1933.      F. ALLENDORFF      1,925,621
SNAPPER COUPLING FOR MAGNETOS

Filed July 3, 1930

Patented Sept. 5, 1933

1,925,621

UNITED STATES PATENT OFFICE 1,925,621

SNAPPER COUPLING FOR MAGNETOS

Fritz Allendorff, Stuttgart, Germany, assignor to Robert Bosch Aktiengesellschaft, Stuttgart, Germany Application July 3, 1930, Serial No. 465,768, and in Germany July 16, 1929

5 Claims. (Cl. 123—149)

The present invention relates to a snapper coupling by means of which the armature of a magneto can be jerked forward intermittently by a spiral spring to increase the intensity of the spark.

The object of the present invention is the lubrication of these spiral springs. During the travelling period the convolutions of the spiral spring are repeatedly drawn together and tensioned in very quick sequence; the convolutions being thereby forced together with great pressure so that the oil is at times pressed out of the spring so that it may become quite dry.

According to the present invention a layer of lubricant-impregnated substance such as fibre, textile material or the like saturated in grease is laid between the convolutions of the spiral spring so that the spring is continuously lubricated. This layer provides the further advantage that the spring is rendered more flexible, because the friction coefficient of steel against fibre, for example, is much smaller than that of steel against steel. The layer also increases the stability of the spring inasmuch as the oscillations caused by quick tensioning and releasing are damped.

Two forms of construction are shown by way of example in the accompanying drawing in which:—

Figure 1:
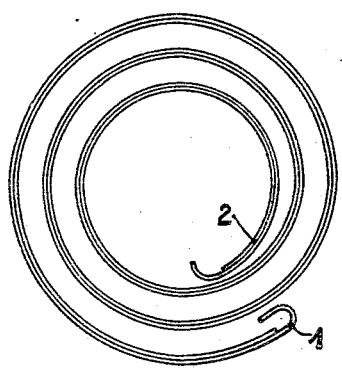
Figure 1 is a plan view of a spiral spring.
Figure 3:
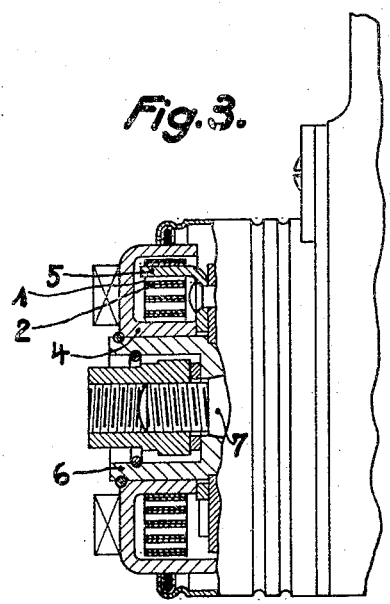
Figure 3 is a longitudinal section of a spiral spring installed in a snapper coupling.

A grease or oil saturated strip of fibre 2 is laid along a spiral spring 1, shown in Fig. 1. The spring can be inserted in the casing of a suitable snapper coupling in the place of any other spiral spring. According to Fig. 3 the inner end of the spring is secured to a driving member 4 and its outer end to a follower 5 of the driven part 6 which in its turn is connected to the armature shaft 7 of the magneto device. The spring serves in known manner to snap or drive the driven part which is periodically held stationary by cams or stops and then released.

Figure 2:
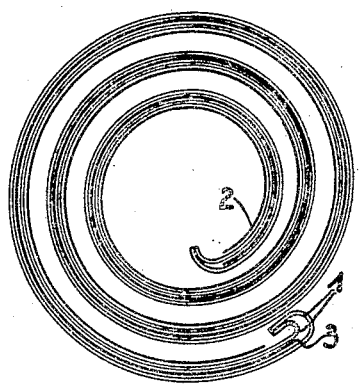
Figure 2 is a plan view of a double spiral spring.

If, as shown in Fig. 2 a double spring consisting of two springs laid one within the other, is used instead of a single spring, then a second layer 3 can be laid between the two springs themselves in addition to the layer 2 between the convolutions of the one spring.

What I claim is:

1. A snapper coupling for magnetos comprising, in combination, a driving part and a driven part, a spiral spring having one end secured to said driving part and its other end secured to said driven part, and a layer of lubricant-impregnated material arranged along the convolutions of the spring.

2. A snapper coupling for magnetos comprising, in combination, a driving part and a driven part, a spiral spring having one end secured to said driving part and its other end secured to said driven part, and a layer of lubricant-impregnated textile material arranged along the convolutions of the spring.

3. A snapper coupling for magnetos comprising, in combination, a driving part and a driven part, a spiral spring having one end secured to said driving part and its other end secured to said driven part and a layer of lubricant-impregnated material arranged in surface to surface contact with the convolutions of said spring.

4. A snapper coupling for magnetos comprising, in combination, a driving part and a driven part, two spiral springs arranged one within the other and in the same plane and having their corresponding opposite ends secured to said driving and said driven parts respectively, a layer of lubricant impregnated material along the convolutions of each spring and between each pair of springs.

5. A snapper coupling for magnetos comprising, in combination, a driving part and a driven part, a spiral spring having a plurality of convolutions and having its inner end secured to said driving part and its outer end secured to said driven part, and a layer of lubricant impregnated material applied in surface to surface contact with one side of the convolutions of said spring.

FRITZ ALLENDORFF.